United States Patent
Babcock et al.

(10) Patent No.: US 8,114,939 B2
(45) Date of Patent: Feb. 14, 2012

(54) METHOD FOR STABILIZING POLYMERS CONTAINING REPEATING LACTIC ACID UNITS, AND STABILIZED POLYMERS SO MADE

(75) Inventors: Laura M. Babcock, Plymouth, MN (US); Joseph D. Schroeder, Minneapolis, MN (US)

(73) Assignee: NatureWorks LLC, Minnetonka, MN (US)

( * ) Notice: Subject to any disclaimer, the term of this patent is extended or adjusted under 35 U.S.C. 154(b) by 0 days.

(21) Appl. No.: 12/599,502

(22) PCT Filed: May 12, 2008

(86) PCT No.: PCT/US2008/063381
§ 371 (c)(1), (2), (4) Date: Nov. 9, 2009

(87) PCT Pub. No.: WO2008/141265
PCT Pub. Date: Nov. 20, 2008

(65) Prior Publication Data
US 2010/0249331 A1 Sep. 30, 2010

Related U.S. Application Data

(60) Provisional application No. 60/930,430, filed on May 16, 2007, provisional application No. 60/930,432, filed on May 16, 2007.

(51) Int. Cl.
*C08G 63/48* (2006.01)

(52) U.S. Cl. .......... 525/69; 525/186; 525/190; 525/410; 525/411; 525/415; 525/450

(58) Field of Classification Search .......... 525/410, 525/411, 415, 450, 69, 186, 190
See application file for complete search history.

(56) References Cited

U.S. PATENT DOCUMENTS

| 3,577,517 A * | 5/1971 | Kubot et al. ............ 424/47 |
| 5,338,822 A | 8/1994 | Gruber |
| 6,114,495 A | 9/2000 | Kolstad |
| 6,353,086 B1 * | 3/2002 | Kolstad et al. ............ 528/354 |

FOREIGN PATENT DOCUMENTS

JP 09-124778 A 5/1997

* cited by examiner

*Primary Examiner* — David W Wu
*Assistant Examiner* — Robert Jones, Jr.
(74) *Attorney, Agent, or Firm* — Gary C Cohn PLLC

(57) ABSTRACT

Metal catalyst residues in resins containing polymerized lactic acid units, such as polylactides, are deactivated by treatment with a polymer or copolymer that contain pendant acid groups and pendant ester groups, with an acid-containing PLA resin, or with a polymer or copolymer having at least one acid groups per 250 atomic mass units and which has pendant lactic acid or poly(lactic acid) groups. The deactivating agent is effective at deactivating the catalyst, and has little effect on the optical clarity of the resin.

17 Claims, No Drawings

METHOD FOR STABILIZING POLYMERS CONTAINING REPEATING LACTIC ACID UNITS, AND STABILIZED POLYMERS SO MADE

This application claims priority from U.S. Provisional Applications 60/930,430 and 60/930,432, both filed 16 May 2007.

This invention relates to methods for stabilizing polymers and copolymers having repeating lactic acid units. Those polymers and copolymers are referred to herein for convenience as "PLA" polymers or resins.

PLA polymers have been used for a long time to make sutures, drug delivery systems and in other biomedical applications. In those applications, biocompatibility and the ability to be absorbed by living tissue are important attributes. PLA polymers for these applications tend to be of low to moderate molecular weight, as high molecular weights are usually not needed for the biomedical applications and are in any case difficult to achieve without using catalysts. The use of catalysts is discouraged when the PLA polymer is to be used in biomedical applications, because of biocompatibility issues. Removing the catalyst involves additional manufacturing steps and expense, and increases the cost of the resin.

More recently, higher molecular weight PLA resins have been developed for use in larger-scale melt-processing applications. These higher molecular weight PLA resins are used to make thermoformed, extruded, injection molded or blow molded articles like deli trays, clamshell trays, films, cups, eating utensils, bottles, foams, fibers, and the like. Higher molecular weight is important in these applications, as thermal properties such as glass transition temperature and crystalline melting temperature are not maximized until the number average molecular weight is about 25,000 or higher. Some physical properties are also dependent on molecular weight. PLA resins tend to undergo some molecular weight degradation during melt processing, so it is important to produce a starting polymer that is high enough in molecular weight that the melt processed polymer still has a molecular weight sufficient to provide satisfactory thermal and physical properties.

A catalyzed polymerization is needed to produce such high molecular weight PLA resins economically. Various metal-containing catalysts can be used, with tin catalysts being generally preferred. For reasons of economics, it is preferred to leave the residual catalyst in the polymer. However, the catalyst residues are known to catalyze a depolymerization reaction when the polymer is melt-processed. In lactic acid homopolymers, this depolymerization reaction leads to the reformation of lactide, which is a cyclic diester of lactic acid. Lactide reformation is a problem for several reasons. Lactide can act as a plasticizer and thus affect the properties of the melt-processed polymers. It can migrate out of the polymer and coat the surfaces of processing equipment. Lactide can be an eye and skin irritant. Lactide is also believed to be easily hydrolyzed to form acidic species, which in turn can contribute to further thermal and hydrolytic degradation of the polymer.

In copolymers of lactic acid and one or more other comonomers, the depolymerization reaction can lead to lactide formation, as well as the formation of other cyclic oligomers, depending on the particular comonomer being used and the manner in which the comonomers have been polymerized together.

Lactide reformation can be reduced by deactivating the residual catalyst. This is a less expensive approach than trying to remove the catalyst residues, and has been adopted commercially. Suitable catalyst deactivating agents are described, for example, in U.S. Pat. No. 6,114,495. These include multifunctional carboxylic acids, and in particular polyacrylic acid.

Some applications for melt-processed PLA resins require good optical transparency. The lack of optical transparency is sometimes referred to as "haze". Low haze PLA resin products have proven to be difficult to achieve, particularly when good heat stability is an additional requirement. It has been found that multifunctional carboxylic acids like polyacrylic acid contribute to haze in PLA resin products. For this reason, an alternative catalyst deactivating agent is desired.

In one aspect, this invention is a process for deactivating metal-containing catalyst residues in a PLA resin, comprising contacting a PLA resin containing residues of a metal-containing catalyst with a deactivating agent, wherein the deactivating agent includes (1) a polymer or copolymer containing pendant acid groups and pendant ester groups, (2) an acid-containing PLA resin that contains at least one acid group per 250 atomic mass units and at least one polylactic acid segment that has a weight of at least 1000 atomic mass units, (3) a polymer or copolymer having at least one acid group per 250 atomic mass units and which has pendant lactic acid or poly(lactic acid) groups, or (4) a mixture of any two or more of (1), (2) and (3).

This invention is also a PLA resin composition comprising a) at least one PLA polymer having a number average molecular weight of from 25,000 to 500,000 containing residues of a metal-containing catalyst, and b) from 0.01 to 2 weight percent, based on the weight of combined weight of components a) and b), of a deactivating agent, wherein the deactivating agent includes (1) a polymer or copolymer containing pendant acid groups and pendant ester groups, (2) an acid-containing PLA resin that contains at least one acid group per 250 atomic mass units and at least one polylactic acid segment that has a weight of at least 1000 atomic mass units, (3) a polymer or copolymer having at least one acid group per 250 atomic mass units and which has pendant lactic acid or poly(lactic acid) groups, or (4) a mixture of any two or more of (1), (2) and (3).

The polymer or copolymer that contains pendant acid groups and pendant ester groups is effective in deactivating the metal catalyst residues, as evidenced by a reduction in lactide reformation (or that of other oligomers) under the test described below. Furthermore, the resulting composition exhibits less haze (and is therefore more highly transparent) than when a polycarboxylic acid copolymer such as polyacrylic acid is used in similar amounts to deactivate the catalyst. As a result, the PLA resin composition has good thermal stability and good transparency, and is useful for making clear articles by melt processing.

For the purposes of this invention, the terms "PLA resin" and "PLA" are used interchangeably to denote polymers having repeating

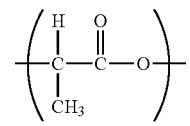

units (lactic acid units). Each polymerized lactic acid unit contains a chiral carbon atom and therefore can exist as either the D- or L-enantiomer. It is preferred that one of the enantiomers, either the L- or D-enantiomer, constitutes at least 85%, more preferably at least 90% and especially from 92 to 99.5%, of the polymerized lactic acid units.

The PLA resin may be a homopolymer containing only lactic acid units (in addition to residues of optional initiator compounds and branching agents). Alternatively, the PLA resin may be a copolymer containing lactic acid units and repeating units derived from another monomer.

A preferred PLA resin has repeating

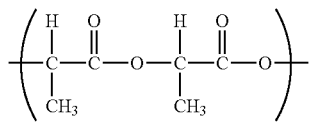

units (lactide units). Each lactide unit contains two polymerized lactic acid units. The lactide units may consist of two consecutive L-lactic acid units (such as is formed by polymerizing L-lactide, which itself is formed from two L-lactic acid molecules), two consecutive D-lactic acid units (such as is formed by polymerizing D-lactide, which itself is formed from two D-lactic acid molecules), or one L-lactic acid and one D-lactic acid (as is formed by polymerizing meso-lactide, which itself is formed from one L- and one D-lactic acid unit), or mixtures of these three types.

The PLA resin may in addition contain polymerized repeating units from one or more other monomers, such as cyclic ethers, cyclic esters and cyclic ester amides. Examples of such other monomers include alkylene oxides (such as ethylene oxide, propylene oxide, butylene oxide, tetramethylene oxide, and the like), glycolide, paradioxanone, morpholinediones, dioxetane-2-one, dioxanones such as p-dioxanone, lactones such as ε-caprolactone or 4-valerolactone and dioxan diones such as tetramethyl-1,4-dioxane-2,5-dione and morpholine-2,5-dione. Such other monomers may be polymerized in random and/or block fashion with the lactide monomer(s).

The PLA resin may also be a copolymer with another polyester, such as can be formed by coupling or interesterification reactions between a PLA resin and another polyester polymer.

The PLA resin preferably contains at least 50% by weight of lactic acid repeating units, more preferably from 80 to 99% by weight of lactic acid repeating units. More preferred PLA resins contain at least 50% by weight of lactide repeating units, more preferably from 80 to 99% by weight of lactide repeating units.

The PLA resin may be linear or branched. If branched, the PLA resin will contain residues of branching agents. Various branching agents are useful, including, for example, an epoxidized fat or oil, as described in U.S. Pat. No. 5,359,026, various peroxides, as described in U.S. Pat. Nos. 5,594,095 and 5,798,435, polyfunctional initiators as described in U.S. Pat. Nos. 5,210,108 and 5,225,521, GB 2277324 and EP 632 081, bicyclic diesters and/or dicarbonates, as described in WO 02/100921, and an acrylate polymer or copolymer containing an average of from about 2 to about 10 free epoxide groups/molecule.

The PLA resin suitably has a number average molecular weight of from about 25,000, more preferably from about 40,000, to about 500,000, preferably to about 300,000, more preferably to about 250,000, as measured by the GPC/DV technique described in WO 02/100921.

The PLA resin can be prepared polymerizing lactide or lactic acid, optionally together with one or more comonomers, or by any other method that introduces lactic acid units and preferably lactide units into the polymer. Preferred PLA resins are prepared by polymerizing lactide, or by copolymerizing lactide with a cyclic comonomer.

A particularly suitable process for preparing the PLA resin is described in U.S. Pat. Nos. 5,247,059, 5,258,488 and 5,274,073. In the process described in those patents, lactide is fed as a liquid directly to a polymerization system, where it is polymerized at elevated temperature in the presence of a catalyst. As molecular weight increases, an equilibrium is established between the polymer and free lactide, thus limiting the build-up of molecular weight and producing a polymer containing a certain amount of free lactide. The free lactide provides some plasticizing effect that is often undesirable, and also tends to coat the surfaces of polymer processing equipment. For these reasons, the polymerization process typically includes a devolatilization step during which the free lactide content of the polymer is reduced, preferably to less than 1% by weight, and more preferably less than 0.5% by weight.

The polymerization can be conducted batch-wise, semi-continuously or continuously. Continuous stirred-tank reactors (CSTRs) and tube or pipe reactors are suitable types of polymerization vessels. A series of CSTRs or tube or pipe reactors may be used to conduct the polymerization in stages. This permits additives to be introduced at specific stages in the polymerization process if desired, and also allows for different reaction conditions to be used at different stages of the polymerization.

Suitable polymerization temperatures preferably are (for solventless processes) above the melting temperature of the monomer or monomer mixture and above the melting temperature of the product copolymer, but below the temperature at which significant polymer degradation occurs. A preferred temperature range is from about 100° C. to about 220° C. A more preferred temperature range is from 120° C. to about 200° C. and especially from about 160° C. to about 200° C. Residence times at polymerization temperatures are selected to produce a polymer of the desired molecular weight and/or desired conversion of monomers.

Molecular weight and conversion are controlled by polymerization time and temperature, the equilibrium between free lactide and the polymer, and by the use of initiator compounds. In general, increasing quantities of initiator compounds on a molar basis will tend to decrease the molecular weight of the product polymer. Unless they are stringently purified, monocyclic monomers such as lactide tend to contain hydroxy-functional and/or acid-functional impurities that act as initiators during the polymerization process. If desired, additional initiator compounds can be added to provide additional control over molecular weight. Suitable initiators include, for example, water, alcohols, glycol ethers and polyhydroxy compounds of various types, such as ethylene glycol, propylene glycol, polyethylene glycol, poly propylene glycol, glycerine, trimethylolpropane, pentaerythritol, hydroxyl-terminated butadiene polymers and the like.

The polymerization is conducted in the presence of a metal-containing catalyst. Examples of these catalysts include various tin compounds such as $SnCl_2$, $SnBr_2$, $SnCl_4$, $SnBr_4$, SnO, tin (II) bis(2-ethyl hexanoate), butyltin tris(2-ethyl hexanoate), hydrated monobutyltin oxide, dibutyltin dilaurate, tetraphenyltin and the like; PbO, zinc alkoxides, zinc stearate, organoaluminum compounds such as aluminum alkoxides, organoantimony compounds such as antimony triacetate and antimony (2-ethyl hexanoate), organobismuth compounds such as bismuth (2-ethyl hexanoate), calcium stearate, magnesium stearate, certain yttrium and rare earth compounds such as are described in U.S. Pat. No. 5,208,667 to McLain et al, and the like. Catalysts are used in catalytically effective amounts, which depend somewhat on the particular catalyst, but are usually in the range of from about 1 mole of catalyst to about 3000-50,000 moles of monomers. Preferred catalyst concentrations are not more than one mole of catalyst per 5000 moles of monomers, and especially not more than one mole of catalyst per 10,000 moles of monomers.

The resulting PLA resin contains metal catalyst residues, which are deactivated in accordance with the invention by contacting the PLA resin with a polymer or copolymer that contains pendant acid groups and pendant ester groups. The deactivating agent can be added to the PLA resin near or at the end of the polymerization, or at any subsequent time, but preferably before the polymer is melt-processed into specific parts. It is preferred to add the deactivating agent to a melt of the PLA resin, prior to or simultaneously with a devolatilization step. It is often convenient to add the deactivating agent in the form of a masterbatch that contains the deactivating agent blended into a small portion of PLA resin. The use of such a masterbatch often makes metering and blending easier. The deactivating agent is conveniently melt blended into a melt of the PLA resin, but solutions of the deactivating agent and PLA resin can be prepared and mixed together as well, with subsequent removal of solvents. Melt blending is generally preferred in large scale operations.

Enough of the deactivating agent is used to deactivate the catalyst residues. Especially in polymers containing 50% or more by weight of lactide units, the rate at which lactide is reformed when the PLA resin is heated to above its melting temperature is a good indicator of the extent to which the catalyst is deactivated. A convenient test for lactide reformation starts with a dried and devolatilized sample of the PLA resin sample. Drying and devolatilization is conveniently done under vacuum at a temperature between the glass transition and crystalline melting temperatures of the resin, preferably from 110 to 120° C., for a period of 18 to 48 hours. The sample is then heated to 250° C. for five minutes, and a portion is removed for measurement of lactide. This first measurement is designated as the background lactide concentration. The remaining sample is then heated for 20 more minutes at 250° C., and the lactide is again measured. The difference in the amount of lactide in the two measurements indicates the amount of lactide that is reformed. Good catalyst deactivation is indicated when the concentration of lactide increases by no more than 0.5% by weight. Preferably, lactide reformation on this test is not more than 0.3% by weight. Lactide content can be measured using gas chromatography or Fourier transform infrared spectroscopy.

In cases in which the PLA resin is a copolymer, other cyclic oligomers may be produced as a result of decomposition reactions. These may be produced in addition to or instead of lactide, depending on the particular PLA resin. In those cases, the deactivation of the catalyst is indicated in an analogous way, measuring the formation of those oligomers rather than simply lactide as described before.

The amount of deactivating agent that is used may depend somewhat on the amount of catalyst residues that are present in the PLA resin. Typically, from 100 ppm to 20,000 ppm, preferably from 200 to 2000 ppm, more preferably from 200 to 1500 ppm and especially from 200 to 800 ppm of the deactivating agent is sufficient to provide the desired catalyst deactivation, based on the combined weight of the PLA resin and the deactivating agent. It is not necessary to remove the deactivating agent from the PLA resin.

The first type of deactivating agent is a polymer or copolymer that contains pendant acid groups and pendant ester groups. The polymer contains pendant carboxyl, sulfonic acid or phosphonic acid groups. The first type of deactivating agent preferably contains at least one such pendant acid group per 250 atomic mass units, more preferably at least one such pendant acid group per 150 atomic mass units. The pendant acid groups are preferably carboxyl or sulfonic acid, and are most preferably carboxyl groups. The acid groups are preferably mainly in the acid form, i.e., are not neutralized with a counter ion. Preferably, at least 80 mole percent of the acid groups are in the acid form. More preferably, from 90 to 100 mole percent of the acid groups are in the acid form, and most preferably from 95 to 100 mole percent are in the acid form. It has been found that when the deactivating agent has a low proportion of neutralized acid groups tend to more effectively deactivate the catalyst residues, and also tend to introduce less haze into the PLA resin, than when a higher proportion of the acid groups are so neutralized. This is seen especially when the ester content of the polymer or copolymer is less than 10 mole-%. However, it may be desirable to neutralize a small proportion of the acid groups anyway, to facilitate handling or for other reasons.

The deactivating agent of the first type also contains pendant ester groups. The pendant ester groups can be carboxylic acid ester groups, sulfonic acid ester groups or phosphonic acid ester groups. Carboxylic acid ester groups are preferred. Repeating units containing the pendant acid groups and the pendant ester groups, respectively, can be randomly distributed through the polymer chain, or can form a block copolymer. The ester groups are preferably alkyl or cycloalkyl esters having from 1 to 20 carbon atoms, preferably from 1 to 12 carbon atoms and especially from 2 to 8 carbon atoms in the alkyl group. The alkyl group may be substituted or unsubstituted. Suitable substituents include aryl groups, halogens, alkoxy groups, and other substituent groups which are not reactive with the PLA resin under the conditions of the mixing or in subsequent melt processing operations. Up to 60 mole percent of the repeating units in the polymer or copolymer may contain pendant ester groups, although it has been found that the desired amount of ester groups depends somewhat on the particular ester group. Generally, it is preferred that no more than 50 mole percent of the repeating units of the polymer or copolymer contain pendant ester groups. At least 1 mole percent, preferably at least 2 mole percent of the repeating units should contain pendant ester groups. If the pendant ester groups are ethyl esters, from 1 to 50, preferably from 3 to 50 mole percent of repeating units containing pendant ester groups can provide good results. Repeating units that contain pendant ester groups with more than 2 carbon atoms in the ester portion (such as methoxyethyl, ethoxyethyl, butyl, hexyl and octyl esters, for example) tend to provide best results when they constitute from 2 to 25 mole percent of the repeating units in the polymer. Repeating units that contain methyl esters tend to provide best results when they constitute from 2 to 50, especially from 2 to 30, mole percent of the repeating units in the polymer.

The first type of deactivating agent may contain repeating units that do not contain acid groups or ester groups. If these groups are present, they should constitute no more than 50, especially no more than 20 and most preferably no more than 10 mole percent of the repeating units.

Preferred deactivating agents of the first type are polymers or copolymers of an ethylenically unsaturated carboxylic acid such as acrylic acid, methacrylic acid, maleic acid, fumaric acid or itaconic acid. Polymers and copolymers of acrylic acid are especially preferred.

It is also possible to polymerize an ethylenically unsaturated acid anhydride such as maleic anhydride or fumaric anhydride to form a polymer having pendant anhydride groups, and then hydrolyze the anhydride groups to form pendant acid groups.

Pendant ester groups can be incorporated into the deactivating agent in various ways. In one method, an ester group-containing comonomer is used to prepare the deactivating agent. Thus, for example, an ethylenically unsaturated ester can be copolymerized with an ethylenically unsaturated acid-containing monomer at the desired proportions, to produce a random copolymer containing both pendant acid groups and pendant ester groups. Examples of such comonomers include alkyl acrylates such as methyl acrylate, ethyl acrylate, n-butyl acrylate, t-butyl acrylate, n-hexyl acrylate, n-octyl acrylate, 2-methoxyethyl acrylate, 2-ethoxyethyl acrylate, various alkyl methacrylates, and the like.

Alternatively, ester groups can be introduced after polymerization of a monomer that contains pendant acid groups, by reaction of the pendant acid groups with an alkylating agent in one or more steps. For example, pendant carboxylic groups can be esterified through a Fisher esterification reaction, in which the starting acid-containing polymer is reacted with an alcohol in the presence of an acid or other suitable catalyst. Water may be removed during the reaction if desired to promote the esterification. Ratios of starting materials and reaction conditions are selected to obtain the desired amount of esterification.

Alternatively, pendant acid groups can be reacted with a compound such as oxalyl chloride to form pendant acid chloride groups. The pendant acid chloride groups can be converted to ester groups through reaction with the corresponding alcohol. HCl that is generated in the reaction can be removed as formed if desired, in order to promote ester formation.

The first type of deactivating agent also can be prepared by polymerizing an ethylenically unsaturated ester, and then hydrolyzing a portion of the ester groups back to the corresponding acid.

Especially preferred deactivating agents of the first type include polymers containing acrylic acid repeating units and alkyl (or substituted alkyl)acrylate repeating units, and from 0 to 10 mole percent of repeating units from one or more other monomers, wherein ethyl acrylate groups may constitute up to 50 mole percent of the repeating units of the polymer, methyl acrylate groups may constitute from 2 to 30 mole percent of the repeating units of the polymer, or alkyl acrylate groups that contain from 2 to 8 carbon atoms in the ester group may constitute from 2 to 25 mole percent of the repeating units of the polymer. In each case, the deactivating agent contains at least one pendant acid group per 250 atomic mass units, more preferably at least one pendant acid group per 150 atomic mass units.

The second type of deactivating agent is a PLA resin that is modified to contain at least one acid group per 250 atomic mass units, preferably at least one acid group per 150 atomic mass units. The acid groups are preferably carboxyl or sulfonic acid, and are most preferably carboxyl groups. The acid groups are preferably mainly in the acid form, i.e., are not neutralized with a counter ion. Preferably, at least 80 mole percent of the acid groups are in the acid form. More preferably, from 90 to 100 mole percent of the acid groups are in the acid form, and most preferably from 95 to 100 mole percent are in the acid form. As before, a low proportion of neutralized acid groups tends to lead to more effective catalyst deactivation and to introduce less haze into the PLA resin.

Preferred deactivating agents of the second type are copolymers that contain one or more segments having repeating lactic acid or lactic units, as described before, and one or more segments of a polymerized ethylenically unsaturated carboxylic acid such as acrylic acid, methacrylic acid, maleic acid, fumaric acid or itaconic acid. Poly(acrylic acid) segments are especially preferred.

The second type of deactivating agent can be formed by separately forming a PLA resin and a polymer of an ethylenically unsaturated acid, followed by a coupling step. Coupling can occur through reaction of an acid group on the polymer with a terminal hydroxyl group on the PLA resin. Alternatively, functional groups can be introduced into the acid-containing polymer in various ways, and coupling to the PLA resin can be achieved through reaction with the functional groups. An example of such a functional group is an epoxy group, which can be introduced by copolymerizing a monomer such as glycidyl acrylate or glycidyl methacrylate with the ethylenically unsaturated acid. Another coupling strategy uses a separate coupling agent that can react with the acid groups or other functional group on the acid-containing polymer as well as a terminal hydroxyl or carboxyl group on the PLA resin. A polyisocyanate or polyepoxide is suitable for this purpose, as are other functional compounds described before as branching agents.

It is also possible to form the second type of deactivating agent in an analogous way, using a polymer of an ethylenically unsaturated acid anhydride such as maleic anhydride or fumaric anhydride or a polymer of an ethylenically unsaturated ester as a starting material, instead of the acid-containing polymer. Acid groups can then be formed before or after the coupling is performed, by hydrolyzing the anhydride or ester groups to the corresponding acid groups.

A third type of deactivating agent is a polymer or copolymer that has lactic acid or poly(lactic acid) side-chains, and which has at least one acid group per 250 atomic mass units. Such a polymer or copolymer can have a comb-like structure, and can be prepared by reacting a starting polymer or copolymer that has pendant acid groups or acid anhydride groups with lactic acid or a polymer of lactic acid. The lactic acid or lactic acid polymer can react with some or all of the pendant acid groups to form ester linkages and introduce side chains. The side chains in most cases will be terminated in carboxylic acid groups. The side chains can be of any length, but preferably contain from 1 to 10, preferably from 1 to 5 and even more preferably from 1 to 3 lactic acid units per side chain. The starting polymer or copolymer may be, for example, a polymer or copolymer of an ethylenically unsaturated carboxylic acid such as acrylic acid, methacrylic acid, maleic acid, fumaric acid or itaconic acid or a corresponding anhydride. From 1 to 100% of the pendant acid groups on the starting polymer or copolymer can be reacted with lactic acid or a polylactic acid.

The molecular weight of the deactivating agent is selected so that it is nonvolatile and thermally stable and easily dispersible into the PLA resin. By "nonvolatile and thermally stable", it is meant only that the deactivating agent does not volatilize or degrade to any significant extent during ordinary melt processing conditions, such as a temperature of up to 260° C. A number average molecular weight of 500 or more is generally suitable. The upper limit on molecular weight is not considered to be critical as long as the deactivating agent can be dispersed into the PLA resin and the resulting blend remains melt processable. Thus, the deactivating agent may have a number average molecular weight of up to 100,000, up to 200,000, up to 300,000 or even higher. However, the deactivating agent tends to deactivate the catalyst residues more effectively when its molecular weight is lower. A preferred deactivating agent has a number average molecular weight of 20,000 or less, and more preferably 10,000 or less. An especially preferred deactivating agent has a number average molecular weight of from 1500 to 6000.

The second type of deactivating agent may be a block copolymer containing PLA segments and acid-containing segments. The molecular weight of the PLA segments is not particularly important, and can each be as high as 300,000 ($M_n$) or more, or as low as about 1000. The acid-containing segment(s) suitably have weights of from 500 to 300,000 daltons, more preferably from 1000 to 10,000, and especially from 1500 to 6,000 daltons.

The treated PLA resin product will thus contain a quantity of metal catalyst residues and the deactivating agent. The treated product is preferably devolatilized subsequently to adding the deactivating agent, to reduce the content of cyclic oligomers such as lactide in the product to 2.0% or less by weight. A preferred devolatilized product will contain no more than 1.0% by weight lactide, more preferably no more than 0.5% by weight lactide, and still more preferably no more than 0.3% by weight lactide. As cyclic oligomers such as lactide typically are in equilibrium with the polymer, their concentration in the devolatilized product is generally somewhat greater than zero, although their concentration can be close to zero. The amount of deactivating agent in the product will typically be from 100 ppm to 20,000 ppm, preferably from 200 to 2000 ppm, more preferably from 200 to 1500 ppm and especially from 200 to 800 ppm, based on the combined weight of PLA resin (including catalyst residues), lactide and deactivating agent.

PLA resins treated in accordance with the invention can exhibit very good optical transparency, although it will be recognized that the optical properties of the PLA resin can be affected greatly by the presence of additional components, or even the manner in which the PLA resin is processed. A PLA resin in accordance with the invention, which contains only the PLA polymer, metal catalyst residues, up to 0.5% of lactide and the deactivating agent, typically exhibits better transparency than a similar PLA resin that is treated with an equal quantity (by weight) of polyacrylic acid. Such a PLA resin in accordance with the invention preferably exhibits a haze value of no greater than 4.5%, preferably no greater than 4.0% and even more preferably no more than 3.5%. These values are preferably achieved when using enough of the deactivating agent to provide the PLA resin composition with a lactide reformation of no more than 0.5%, preferably no more than 0.3%, on the test described before.

Haze values, for purposes of this invention, are determined on compression molded plaques that are molded at 200° C. and 10,000 psi for 2 minutes, to provide plaques that are nominally 18 mil (0.25 mm) thick and have a highly smooth surface. Haze is measured according to ASTM D1003-00 using a BYK Gardner Haze-Gard Plus instrument. % Haze is equal to 100%-% transmittance. Haze and sample thickness are measured on at least 5 sections of the test plaque. All haze measurements are then normalized to 18 mil thickness, and the average of the measurements is taken as the haze value. Haze measurements will typically include a contribution due to surface imperfections and irregularities, and another contribution due to the properties of the sample itself. The surface contribution to the haze measurements can be quite significant if the surface is very rough or irregular. The use of test samples having highly smooth surfaces minimizes the surface contribution to the measurement. Another way to eliminate the surface contribution to haze measurements is to immerse or coat the sample with a liquid having approximately the same refractive index as the sample.

Although the invention is not limited to any theory, it is believed that the deactivating agent used in this invention is more soluble in the PLA resin than polyacids such as polyacrylic acid. It is believed that the higher solubility leads to reduced haze in the treated PLA resin. In addition, the reduction in haze may in some cases be due to the refractive index of the deactivating agent. By esterifying a proportion of the acid groups, the refractive index of the deactivating agent can sometimes be more closely matched to that of the PLA resin. By converting about 15-20% of the acid groups on a polyacrylic acid to the ethyl ester, the refractive index of the esterified polymer can be adjusted to be very close to that of polylactide homopolymers. The closer match in refractive index improves optical clarity.

Therefore, a preferred deactivating agent for use in the invention is a partially esterified acid-functional polymer or copolymer, which has a least one acid group per 250 atomic mass units and especially at least one acid group per 150 atomic mass units, and which has a refractive index from 1.35 to 1.50, especially from 1.42 to 1.48. More preferably, from 90 to 100 mole percent of the pendant acid groups in this preferred deactivating agent are not neutralized, i.e. are in the acid form with no counterion.

The good optical clarity of the treated PLA resin makes it particularly suitable for use in applications such as bottles, clear thermoformed articles such as deli trays and clamshells, clear injection molded parts, and the like. Because of the better optical clarity of the treated PLA resin, there is more latitude to develop crystallinity in the resin (to provide, for example, better heat resistance) or to incorporate other additives into the composition which may contribute to haze, and still obtain a product having acceptable optical clarity.

The treated PLA resin can also be used in other applications in which PLA resin polymers are useful, such as fibers (including staple fibers, monofilament fibers, blended fibers, textured fibers, bicomponent fibers, yarns and the like), films such as cast film, blown film, oriented film (including biaxially oriented film where stretching is performed in two directions either simultaneously or sequentially), extruded foam, blow molded articles, compression molded articles, sheet molded articles, injection molded articles, extrusion coatings, paper coatings and other applications.

The PLA resin of the invention can be compounded with additives of many types, including antioxidants, preservatives, catalyst deactivators, stabilizers, plasticizers, fillers, nucleating agents, colorants of all types and blowing agents. The copolymer may be blended with other resins, and laminated or coextruded to other materials to form complex structures.

The following examples are provided to illustrate the invention but are not intended to limit the scope thereof. All parts and percentages are by weight unless otherwise indicated.

EXAMPLES 1-9

Approximately 150.13 g of a 2000 molecular weight ($M_n$) polyacrylic acid is dissolved in about 4 liters of absolute ethanol in the presence of 15.5 g of a strong acid ion exchange resin (Amberlyst from Rohm and Haas). The mixture is heated to 76° C. with stirring under a chilled condenser. The reaction is monitored by acid-base titration in parallel with proton NMR. The reaction is aborted when proton NMR indicates that 10% of the acid groups have been converted to the ethyl ester and acid-base titration levels indicate 90% of the acid groups remain. This polymer is designated Deactivating Agent 1. The reaction mixture is filtered, and then distilled at 40° C. under vacuum to remove unreacted ethanol.

About 200 g of water is added to the residue, and then removed under vacuum until a 50% solution of the polymer in water is obtained.

Deactivating Agents 2 and 3 are prepared in a similar manner, except 20% of the acid groups are converted to the ethyl ester to form Deactivating Agent 2 and 50% of the acid groups are converted to the ethyl ester to form Deactivating Agent 3.

Deactivating Agent 4 is prepared in an analogous manner, using methanol instead of ethanol to esterify 30% of the acid groups. Deactivating Agent 5 is prepared in an analogous manner, using n-butanol to esterify 20% of the acid groups. Deactivating Agents 6, 7 and 8 are also prepared in an analogous manner, using n-octanol to esterify 5%, 10% and 20%, respectively, of the acid groups.

Deactivating Agent 9 is made as follows: Approximately 10.03 g of a 2000 molecular weight ($M_n$) polyacrylic acid is dissolved in about 200 milliliters of tetrahydrofuran and about 25 microliters of dimethylformamide in a round bottom flask, and the flask is lowered into a 0° C. ice bath. A solution of approximately 12 milliliters of oxalyl chloride and about 12 milliliters of tetrahydrofuran is transferred to an addition funnel attached to the round bottom flask. The oxalyl chloride solution is added dropwise to the round bottom flask, the ice bath is removed, and the mixture is stirred at room temperature overnight. Solvent is removed from one hundred milliliters of the mixture by rotary evaporation, and 100 milliliters of fresh tetrahydrofuran are added back to the flask. To this mixture, approximately 3.75 g of 2-methoxyethanol and 2 milliliters water are added, and the solution is stirred overnight. The mixture is stripped of solvent by rotary evaporation and NMR results show conversion of about 14% of the acid groups to the methoxyethyl ester.

A masterbatch is formed from a PLA resin and Deactivating Agent 1. A solution of 10% of the PLA resin in methylene chloride is formed, and mixed with a solution of Deactivating Agent 1 in methylene chloride, tetrahydrofuran or a 1:1 mixture of tetrahydrofuran and water. Proportions are chosen to produce a blend containing 5% of Deactivating Agent 1 in 95% of the PLA resin. The mixtures are allowed to stir briefly and are then poured out into shallow trays. The solvent evaporates, and the solid residue is then further dried under vacuum and chopped. Separate masterbatches are made in the same manner, using each of Deactivating Agents 1-9.

A PLA resin containing 20.8 ppm tin catalyst residues is treated with Deactivating Agent 1 as follows: The PLA resin is melted by heating it in a Brabender apparatus at 200° C. for 2 minutes. The masterbatch containing deactivating agent is then added and mixed into the PLA resin at 200° C. for 3 minutes. 100 parts of PLA resin are used per part masterbatch, so the resulting blend contains 500 ppm of Deactivating Agent 1. The blend is scraped down, cooled to room temperature, coarsely ground, and dried under vacuum overnight at 115° C. It is designated Example 1.

Catalyst deactivation in Example 1 is determined by the lactide reformation test described before. Haze is determined for Example 1 on nominally 18 mil samples according to ASTM D1003-00 using a BYK Gardner Haze-Gard Plus instrument, again as described before.

Examples 2-9 are prepared and tested in the same manner, using the masterbatches containing Deactivating Agents 2-9, respectively.

For comparison, lactide reformation and haze are measured on the untreated PLA resin (Comparative Sample A). Also for comparison, lactide reformation and haze are measured on a sample of the same PLA resin that has been treated with 500 ppm of polyacrylic acid (Comparative Sample B).

Results of the foregoing testing are as reported in Table 1.

TABLE 1

| Example or Comparative Sample No. | Deactivating Agent | | | Haze, % | Lactide Reformation, % |
|---|---|---|---|---|---|
| | No. | Ester Type | % Ester | | |
| 1 | 1 | Ethyl | 10 | 3.7 | 0.5 |
| 2 | 2 | Ethyl | 20 | 3.3 | 0.5 |
| 3 | 3 | Ethyl | 50 | 4.3 | 0.25 |
| 4 | 4 | Methyl | 30 | 4.2 | 0.2 |
| 5 | 5 | n-Butyl | 20 | 4.0 | 0.5 |
| 6 | 6 | n-Octyl | 5 | 4.3 | 0.05 |
| 7 | 7 | n-Octyl | 10 | 4.3 | 0.5 |
| 8 | 8 | n-Octyl | 20 | 4.0 | 0.5 |
| 9 | 9 | 2-methyoxyethyl | 14 | 4.1 | 0.4 |
| A* | None | — | — | 3.7 | 3.0 |
| B* | PAA[1] | None | None | 4.9 | 0.2 |

*Not an example of the invention.
[1]Polyacrylic acid.

Deactivating Agents 1-8 all provide good deactivation of the catalyst residues, as indicated by the low lactide reformation, and make little or no contribution to haze, at the 500 ppm level evaluated. Comparative Sample A illustrates the effect of not using a deactivating agent. In that case, lactide reformation becomes very high. Polyacrylic acid (Comparative Sample B) is very effective at reducing lactide formation, but increases haze much more than do any of Deactivating Agents 1-9.

EXAMPLE 10

In this example, a PLA resin containing 25 ppm of residues of a tin catalyst is treated with 500 ppm of a 4500 molecular weight terpolymer containing both carboxylic acid and sulfonic acid groups, of which 12 mole-% are esterified. This terpolymer is commercially available as Syntran 8136, from Interpolymer, Canton, Mass. The acid groups in this product have not been neutralized with a base, and so almost all are in the acid form. The terpolymer contains about 65 ppm sodium.

A masterbatch is formed by melting the PLA resin in an extruder, and mixing an aqueous solution of the terpolymer with the molten PLA resin in the extruder barrel. The mixture then passes through the extruder die and is pelletized. The masterbatch pellets contain 4.5% by weight of the terpolymer. The masterbatch is then let down into more PLA resin by blending the masterbatch pellets with pellets of the additional PLA resin, and extruding the blend. The ratios of masterbatch and PLA resin are chosen to produce a blend containing 500 ppm of the terpolymer.

Haze and lactide reformation are evaluated as before. Haze is approximately 2.95%, and lactide reformation is approximately 0.09%.

EXAMPLES 11-14

Example 11 is prepared by treating a polylactide resin containing 25 ppm of tin catalyst residues with 500 ppm of a 2000 $M_n$ copolymer of 5 mole percent ethyl acrylate and 95 mole percent acrylic acid, in a manner analogous to that described in Example 10. Approximately 20% of the acid groups are in the form of the sodium salt. The copolymer contains about 6% by weight of sodium. This copolymer is commercially available as Acumer™ 2200, from Rohm and Haas. Haze and lactide reformation are determined as before, with results as indicated in Table 2.

Example 12 is prepared in the same manner, except this time the Acumer 2200 material is first passed through a column of a macroporous strong acid ion exchange resin in the acid form to convert sodium carboxylate groups to the free acid form, the sodium content of the copolymer being reduced in this manner to about 1% by weight. Haze and lactide reformation are determined as before, with results as indicated in Table 2.

Example 13 is prepared by treating a polylactide resin containing 25 ppm of tin catalyst residues with 500 ppm of a 3000 $M_n$ copolymer of 3.5 mole percent ethyl acrylate and 96.5 mole percent acrylic acid, in a manner analogous to that described in Example 10. Approximately 20% of the acid groups are in the form of the sodium salt. The copolymer contains about 6 weight percent of sodium. This copolymer is commercially available as Romax™ 7200, from Rohm and Haas. Haze and lactide reformation are determined as before, with results as indicated in Table 2.

Example 14 is prepared in the same manner as is Example 13, except this time the Romax 7200 material is first ion exchanged as described with regard to Example 12, to convert sodium carboxylate groups to the free acid form, the sodium content being reduced in this manner to about 1 weight percent. Haze and lactide reformation are determined as before, with results as indicated in Table 2.

TABLE 2

| Example No. | Deactivating Agent | | | Haze, % | Lactide Reformation, % |
|---|---|---|---|---|---|
| | Sodium Content in Deactivating Agent, % | Ester Type | % Ester | | |
| 11 | 6 | Ethyl | 5 | ~5.1 | 0.4 |
| 12 | 1 | Ethyl | 5 | ~2.9 | 0.1 |
| 13 | 6 | Ethyl | 3.5 | ~8.2 | 0.4 |
| 14 | 1.0 | Ethyl | 3.5 | ~3.2 | 0.1 |

These results indicate that a deactivating agent having a low degree of esterification (3.5-5%) performs best when the acid groups are almost all in the free acid form (rather than in salt form). In these examples (in which only a small proportion of the acid groups have been esterified) increased neutralization of the deactivating agent (as indicated here by sodium content) tends to decrease the efficiency of the deactivating agent, as indicated by lactide reformation levels. This is seen by comparing Examples 11 and 13 with Examples 12 and 14. Similarly, haze is better in those Examples in which fewer of the acid groups have been neutralized.

EXAMPLES 15-22

A deactivating agent is produced by treating a 2000 $M_n$ copolymer of about 5 mole percent ethyl acrylate and 95 mole percent acrylic acid (Acumer™ 2200 from Rohm and Haas, Philadelphia, Pa.), in the manner described in Example 12 to remove sodium. A masterbatch containing 4.5% of this deactivating agent in PLA is prepared as described in Example 10. This masterbatch is let down into a PLA resin that contains about 28 ppm of tin, which is a residue from a tin catalyst. The let-down resin contains 400 ppm of the deactivating agent, and is designated as Example 15.

Example 16 is formed the same way, except it contains 52 ppm of the tin catalyst residue and 400 ppm of the deactivating agent.

Examples 19 and 20 are formed by letting down the masterbatch to a level of 600 ppm in PLA resins that contain 27 and 51 ppm of tin respectively.

Another deactivating agent is prepared in the same manner as Deactivating Agent 1 (Example 1), except that this deactivating agent contains 15 mole percent of ethyl ester groups and 85 mole percent of pendant acid groups. A masterbatch is formed from this deactivating agent in the same manner as described in Example 10. The masterbatch is let down in to a PLA resin in the same manner as described for Examples 15, 16, 19, and 20, respectively, to form Examples 17, 18, 21 and 22.

Comparative Samples C—F are made using the Acumer™ 1020 copolymer as a deactivating agent. This product has approximately 3% of the acid groups neutralized with sodium hydroxide and is used as received.

Total haze and lactide reformation are determined on each of Examples 15-22 and Comparative Samples C-F in the manner described before. Internal haze is measured according to ASTM D1003-00 using a BKY Gardner Haze-Gard Plus instrument where the sample is immersed in a cuvette containing corn oil to remove haze effects from surface imperfections as described previously. Results are reported in Table 3.

TABLE 3

| Ex. or Comp. Sample No. | Deactivating Agent | | Deactivating Agent Level (ppm) | Tin Level (ppm) | Total Haze, % | Internal Haze, % | Lactide Reformation % |
|---|---|---|---|---|---|---|---|
| | Ester Type | Ester % | | | | | |
| 15 | Ethyl | 5 | 400 | 28 | 2.7 | 0.27 | Not detected |
| 16 | Ethyl | 5 | 400 | 52 | 2.9 | 0.46 | 0.01 |
| 17 | Ethyl | 15 | 400 | 27 | 2.6 | 0.41 | Not detected |
| 18 | Ethyl | 15 | 400 | 57 | 2.8 | 0.55 | Not detected |
| 19 | Ethyl | 5 | 600 | 27 | 2.9 | 0.43 | Not detected |
| 20 | Ethyl | 5 | 600 | 51 | 2.7 | 0.48 | Not detected |
| 21 | Ethyl | 15 | 600 | 28 | 2.8 | 0.49 | Not detected |
| 22 | Ethyl | 15 | 600 | 57 | 2.9 | 0.67 | 0.06 |
| C* | None | None | 400 | 28 | 2.9 | 0.46 | Not detected |
| D* | None | None | 400 | 60 | 3.9 | 1.55 | Not detected |
| E* | None | None | 600 | 29 | 3.2 | 0.77 | Not detected |
| F* | None | None | 600 | 58 | 4.2 | 1.89 | Not detected |

*Not an example of the invention.

The data in Table 3 shows that all of the deactivating agents performed similarly in preventing lactide formation. At the lower residual catalyst level (28-29 ppm tin), small differences in total haze are seen, but at higher tin levels, the haze exhibited by Comparative Samples D and F is significantly higher (compare with Examples 16, 18, 20 and 22).

It will be appreciated that many modifications can be made to the invention as described herein without departing from the spirit of the invention, the scope of which is defined by the appended claims.

What is claimed is:

1. A process for deactivating metal-containing catalyst residues in a PLA resin, comprising contacting PLA resin containing residues of a metal-containing catalyst with a deactivating agent that includes (1) a polymer or copolymer having pendant acid groups and pendant ester groups wherein the polymer or copolymer contains from 3 to 50 mole percent of repeating units that contain pendant ethyl ester groups, or from 2 to 25 mole percent of repeating units that contain pendant ester groups with more than 2 carbon atoms in the ester portion, (2) a polymer or copolymer having at least one acid group per 250 atomic mass units and which has pendant lactic acid or poly(lactic acid) groups, or (3) a mixture of (1) and (2).

2. The process of claim 1, wherein the PLA resin contains from 80 to 99% by weight of repeating lactide units.

3. The process of claim 1, wherein the deactivating agent is a polymer or copolymer having pendant acid groups and pendant ester groups, wherein the polymer or copolymer contains from 3 to 50 mole percent of repeating units that contain pendant ethyl ester groups, or from 2 to 25 mole percent of repeating units that contain pendant ester groups with more than 2 carbon atoms in the ester portion, which polymer or copolymer contains at least one pendant acid group per 250 atomic mass units.

4. The process of claim 3, wherein the polymer or copolymer having pendant acid groups and pendant ester groups contains from 2 to 50 mole percent of ethyl carboxylic acid ester repeating units.

5. The process of claim 3, wherein the polymer or copolymer having pendant acid groups and pendant ester groups contains from 2 to 25 mole percent of repeating alkyl or substituted alkyl carboxylic acid ester repeating units in which the alkyl or substituted alkyl group contains from 3 to 8 carbon atoms.

6. The process of claim 1, wherein the polymer or copolymer having pendant acid groups and pendant ester groups has a refractive index from 1.35 to 1.50.

7. The process of any claim 1, wherein the polymer or copolymer having pendant acid groups and pendant ester groups has a number average molecular weight from 1500 to 6000.

8. The process of claim 1, wherein the metal is tin.

9. The process of claim 1, wherein the PLA resin is contacted with from 200 to 1500 ppm of the deactivating agent.

10. A PLA resin composition comprising a) at least one PLA resin polymer having a number average molecular weight of from 25,000 to 500,000 containing residues of a metal-containing catalyst, and b) from 0.01 to 2 weight percent, based on the weight of combined weight of components a) and b), of a deactivating agent that includes (1) a polymer or copolymer having pendant acid groups and pendant ester groups, wherein the polymer or copolymer contains from 3 to 50 mole percent of repeating units that contain pendant ethyl ester groups, or from 2 to 25 mole percent of repeating units that contain pendant ester groups with more than 2 carbon atoms in the ester portion, (2) a polymer or copolymer having at least one acid group per 250 atomic mass units and which has pendant lactic acid or poly(lactic acid) groups, or (3) a mixture of (1) and (2).

11. The composition of claim 10, wherein the PLA resin contains from 80 to 99% by weight of repeating lactide units.

12. The composition of claim 11, wherein the polymer or copolymer has a refractive index of from 1.35 to 1.50.

13. The composition of claim 11, wherein the polymer or copolymer has a number average molecular weight from 1500 to 6000.

14. The composition of claim 11, wherein the metal is tin.

15. The composition of claim 11, wherein the PLA resin contains from 200 to 1500 ppm of the polymer or copolymer.

16. The composition of claim 11 which contains up to 0.3% by weight lactide, based on the combined weight of components a), b) and the lactide.

17. The process of claim 3 wherein from 90 to 100 mole percent of the pendant acid groups are not neutralized with a counterion.

* * * * *